Aug. 2, 1966 W. B. JORDEN ET AL 3,264,416

TRANSDUCER

Filed May 6, 1963

INVENTORS.
WILLIAM B. JORDEN
EDWARD A. MURPHY
WILLIAM POSNER
BY R. J. Frank
ATTORNEY.

United States Patent Office 3,264,416
Patented August 2, 1966

3,264,416

TRANSDUCER

William B. Jorden, Malverne, Edward A. Murphy, Farmingdale, and William Posner, Brooklyn, N.Y., assignors to General Telephone and Electronics Laboratories, Inc., a corporation of Delaware Filed May 6, 1963, Ser. No. 278,274
4 Claims. (Cl. 179—110)

Our invention is directed toward electromechanical transducers which utilize semiconductor crystals and which make use of the Hall effect.

When a semiconductor crystal is subjected to the influence of an applied magnetic field having a fixed orientation with respect to the crystal and, at the same time, a current is passed through the crystal in a direction perpendicular to that of the magnetic field, an electric field is generated within the crystal. The direction of this generated field is perpendicular both to the direction of the magnetic field and to the direction of current flow; the intensity of the generated field being a function of the product of the current density and the intensity of the magnetic field. This process of generating an electric field is known as the Hall effect.

Conventionally, the crystal and the magnet producing the applied magnetic field have a fixed relationship with respect to each other. However, we have observed that when the direction of the magnetic field is varied as, for example, by rotating the crystal in the field, the electric field intensity will vary. Further, when the magnetic field intensity and the current density are held constant and the crystal is rotated, we have found that the intensity of the generated electric field will vary in a predictable manner. Moreover, we have invented means for converting incident sound waves into rotational movement of a semiconductor crystal employing the Hall effect in such manner that the variations in the intensity of the generated electric field are substantially proportional to the intensity variations of the incident waves, thus producing an electromechanical transducer which can be used as a microphone.

Accordingly it is an object of our invention to provide a new type of electromechanical transducer.

Another object is to provide a new type of microphone.

Still another object is to provide a new type of microphone which utilizes semiconductor crystals and makes use of the Hall effect.

These and other objects of our invention will either be explained or will become apparent hereinafter.

In accordance with the principles of our invention, a single crystal semiconductor wafer having an axis of symmetry is suspended about this axis in such manner as to be rotatable. More particularly, the wafer, in the absence of any applied mechanical force tending to produce rotation of the wafer, assumes a given reference position. When a mechanical force is applied, the wafer is rotated through an arc in a direction determined by the direction of the force. The length of the arc through which the wafer is rotated varies directly with the magnitude of the force, the arc length increasing or decreasing as the magnitude of the force increases or decreases.

A time invariant magnetic field is established within the wafer, the magnetic field vector pointing along a direction perpendicular both to the electric field and the axis of symmetry. The instantaneous polarity of the electric field is either positive or negative, depending upon the direction of rotation of the wafer, and reverses when the direction of rotation is reversed. The instantaneous intensity of the electric field is determined by the arc length through which the wafer is rotated with respect to the given reference position. When the wafer is in the reference position, the intensity of the generated electric field is zero.

Consequently, when incident sound waves are converted into a rotational force exerted on the wafer, as for example by mechanically coupling a sound-responsive diaphragm to the wafer, the variations in the generated electric field will be substantially proportional to the intensity variations in the incident sound waves. Thus the device so used functions as a microphone.

An illustrative embodiment of our invention will now be described with reference to the accompanying drawings wherein.

Figure 1:
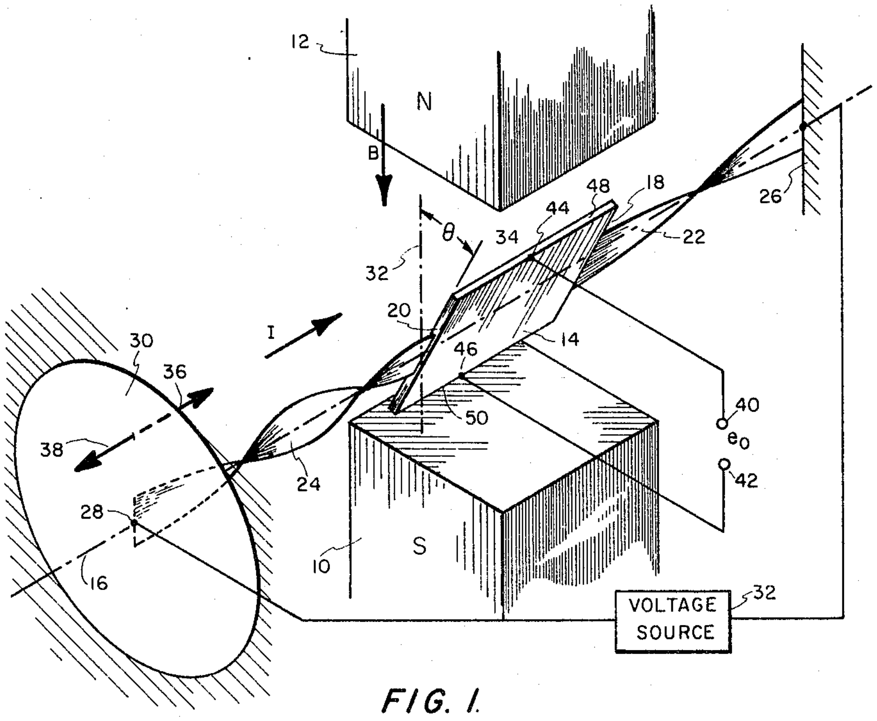
FIG. 1 is a perspective view of our invention.

Referring now to FIG. 1, there is shown a permanent magnet having separated north and south magnetic pole pieces 10 and 12, the resultant time invariant magnetic field vector B pointing from the north pole to the south pole as indicated in FIG. 1.

A single crystal semiconductor wafer 14 formed for example of germanium is suspended between the pole pieces having an axis of symmetry as indicated at 16 which is perpendicular to the vector B. Typically, wafer 14 can be .25 centimeter wide by .5 centimeter long by .005 centimeter thick. Two opposite edges 18 and 20 are each secured to one end of corresponding twisted metal ribbons 22 and 24. These ribbons are twisted in opposite senses and can be formed of beryllium-copper or any suitable non-magnetic spring material.

The other end of ribbon 22 is secured to a fixed surface 26. The other end of ribbon 24 is secured to the center 28 of one surface of a circular diaphragm 30. A voltage source 32 is coupled between ribbons 22 and 24. When a battery is used for source 32, a direct current of constant magnitude is caused to flow through the wafer 14 in a direction parallel to axis 16.

When sound waves do not impinge upon diaphragm 30, the angle $\theta$ between a line 32 parallel to vector B and perpendicular to axis 16 and a line 34 (parallel to the surfaces of the wafer 14 and perpendicular to axis 16) is zero.

When sound waves impinge upon the diaphragm 30 (note that the periphery of diaphragm 30 is held fixed in position) the surface of the diaphragm vibrates back and forth in a direction parallel to the axis of symmetry 16. This motion is transmitted to the wafer 14 by the simultaneous flexing and unflexing action of ribbons 22 and 24. When the diaphragm excursion is in the direction of the dashed arrow 36 angle $\theta$ attains a positive value, i.e. the wafer is rotated clockwise with respect to the zero angular reference position viewing the wafer from the diaphragm. When the direction of the diaphragm excursion is reversed as shown at 38, angle $\theta$ attains a negative value, i.e. is rotated counterclockwise with respect to the zero position. In each case, the size of the angle is determined by the intensity of the sound wave producing the excursion and the direction of the excursion is determined by the instantaneous value of the rarefaction or densification of the sound wave as it strikes the diaphragm.

Output terminals 40 and 42 are connected to corresponding contacts 44 and 46 on opposite edges 48 and 50 of wafer 14. As the wafer rotates, an electric field is generated between contacts 44 and 46 (by virtue of the Hall effect) and an output voltage $e_0$ appears between terminals 40 and 42.

Figure 2:
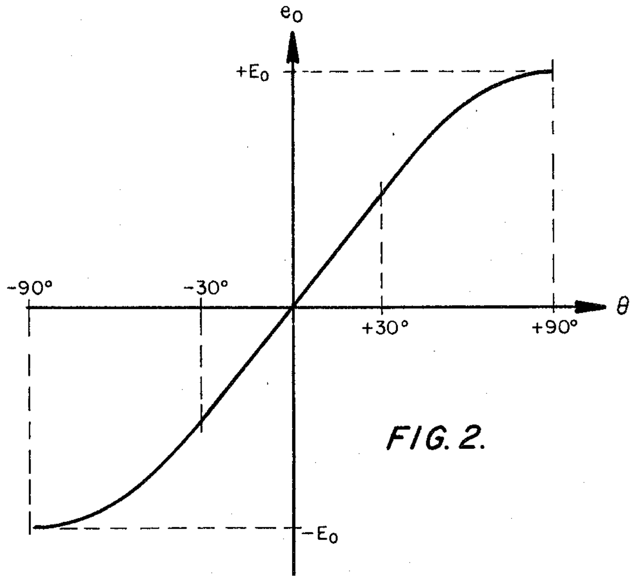
FIG. 2 is a graph illustrating the relationship between the angular rotation of the wafer and the electric field generated in the wafer.

As angle $\theta$ is varied between two extreme values of $+90°$ and $-90°$, voltage $e_0$ varies between maximum positive and negative values of $+E_0$ and $-E_0$ as shown in FIG. 2. As can be seen in FIG. 2, when angle $\theta$ is constrained to an absolute value of about 30 degrees, the voltage $e_0$ and the angle $\theta$ vary essentially linearly.

Under these conditions, if the sound wave variations are limited to those which maintain angle $\theta$ within the 30 degree limit described above, the device of FIG. 1 functions as a linear electromechanical transducer or microphone. When the sound wave variations are not so limited the linearity is reduced with corresponding impairment of fidelity. However, transducer action still occurs and our device can be used for applications permitting standards of lower fidelity.

If source 32 is a carrier voltage having a frequency which is high compared to the audio frequency, (for example greater than 10 kilocycles), then the voltage appearing across output terminals 40, 42 is a double-sideband suppressed-carrier signal.

While we have shown and pointed out our invention as applied above, it will be apparent to those skilled in the art that many modifications can be made within the scope and sphere of our invention.

What is claimed is:

1. A Hall effect device comprising
(a) a single crystal semiconductor wafer having an axis of symmetry;
(b) first means responsive to a mechanical force applied thereto and coupled to said wafer to rotate same through an arc about said axis, the arc length being determined by the magnitude of said force, the direction of rotation being clockwise when said force is exerted in one direction and being counterclockwise when the direction of said force is reversed;
(c) second means associated with said wafer to establish a magnetic field therein, the magnetic field vector pointing in a direction perpendicular to said axis, the angular orientation of said wafer with respect to the direction in which the magnetic field vector points being determined by said force; and
(d) a diaphragm responsive to incident sound waves and coupled to said first means to exert said force thereon, the magnitude and direction of said force being determined by the phase and intensity of said waves.

2. A Hall effect device comprising
(a) a single crystal semiconductor wafer having an axis of symmetry;
(b) first means responsive to a mechanical force applied thereto and coupled to said wafer to rotate same through an arc about said axis, the arc length being determined by the magnitude of said force, the direction of rotation being clockwise when said force is exerted in one direction and being counterclockwise when the direction of said force is reversed, said first means being adapted for passing current therethrough and through said wafer in a direction parallel to said axis;
(c) second means associated with said wafer to establish a magnetic field therein, the magnetic field vector pointing in a direction perpendicular to said axis, the angular orientation of said wafer with respect to the direction in which the magnetic field vector points being determined by said force, whereby when said current flows, an electric field is generated within said wafer, the electric field vector being perpendicular to the magnetic field vector and pointing in a direction perpendicular to said axis, the intensity and polarity of said electric field being determined by said angular orientation, and
(d) third means responsive to incident sound waves and coupled to said first means to exert said force thereon, the magnitude and direction of said force being determined by the phase and intensity of said waves.

3. A Hall effect device comprising
(a) a single crystal semiconductor wafer having an axis of symmetry;
(b) first means responsive to a mechanical force applied thereto and coupled to said wafer to rotate same through an arc about said axis, the arc length being determined by the magnitude of said force, the direction of rotation being clockwise when said force is exerted in one direction and being counterclockwise when the direction of said force is reversed, said first means including first and second twisted metal ribbons twisted in opposite sense and extending along said axis, said ribbons being secured at one end to said wafer at spaced apart locations, and
(c) second means associated with said wafer to establish a magnetic field therein, the magnetic field vector pointing in a direction perpendicular to said axis, the angular orientation of said wafer with respect to the direction in which the magnetic field vector points being determined by said force.

4. A Hall effect device comprising
(a) a single crystal rectangular semiconductor wafer having first and second opposite edges and third and fourth opposite edges extending between said first and second edges, said crystal having an axis of symmetry extending midway between said first and second edges,
(b) first and second twisted conducting ribbons each having one end affixed to said third and fourth edges respectively at the points where said axis of symmetry intersects said edges, said ribbons extending along said axis of symmetry,
(c) a diaphragm responsive to incident sound waves coupled to the other end of said first ribbon, said diaphragm being restrained along its outer periphery,
(d) means maintaining the other end of said second ribbon fixed in position,
(e) means for producing a magnetic field normal to the axis of symmetry and parallel to the third and fourth edges of said wafer,
(f) means for producing an electric current in said wafer, said current flowing in the direction of said current, and
(g) first and second electrodes affixed to said wafer on said first and second edges respectively, the voltage produced across said electrodes being determined by the magnitude of said magnetic field, the magnitude of said current, and the angular displacement of said wafer about its axis of symmetry.

References Cited by the Examiner

UNITED STATES PATENTS 3,123,725 3/1964 Nieda ---------------- 310—2

KATHLEEN H. CLAFFY, *Primary Examiner.*

F. W. CARTEN, *Assistant Examiner.*